United States Patent [19]

Gay

[11] 3,740,935
[45] June 26, 1973

[54] GROUND ENGAGING BALER
[75] Inventor: James E. Gay, Vinton, Iowa
[73] Assignee: Starline, Inc., Harvard, Ill.
[22] Filed: Aug. 7, 1972
[21] Appl. No.: 278,522

[52] U.S. Cl............................ 56/16.4, 56/1, 56/341
[51] Int. Cl............................................. A01d 75/00
[58] Field of Search........................ 56/1, 16.4, 341, 56/342, 343

[56] References Cited
UNITED STATES PATENTS
3,110,145  11/1963  Avery ....................................... 56/1
3,611,693  10/1971  Geary .................................... 56/343
3,680,296   8/1972  Beebout.............................. 56/16.4

Primary Examiner—Russell R. Kinsey
Attorney—Axel A. Hofgren, Bradford Wiles et al.

[57] ABSTRACT

A hay bale rolling apparatus is adapted to be drawn along a windrow of hay behind a tractor to roll the windrow into a series of separate bales in contact with the ground. A wheeled chassis has parallel side beams with transverse pivot means forward of the wheels. A frame provided with bale forming means has its front end mounted on the pivot means. When a bale reaches a predetermined size, power means located behind the wheels tilts the frame upwardly about the pivot means to raise the rear of the unit and release the bale. The apparatus then returns to normal position to start a new bale.

6 Claims, 2 Drawing Figures

PATENTED JUN 26 1973
3,740,935

GROUND ENGAGING BALER

BACKGROUND OF THE INVENTION

The only known prior art patent which discloses apparatus for rolling a windrow of hay into bales in contact with the ground is Avery U.S. Pat. No. 3,110,145 and its counterpart Australian and British patents. The Avery unit has driven baling chain means which is trained over one pair of fixed sprockets at the front, one pair of upper sprockets which are mounted on pivoted upper arms, and one pair of rear sprockets that are mounted on pivoted rear arms. The upper arms are spring urged to an elevated position and swing downwardly to permit the lower run of the baling chain to arch upwardly as the size of the bale increases. The rear arms are latched in a depending position while a bale is rolled, and when the upper arms have moved down a predetermined distance they unlatch the rear arms which swing upwardly and rearwardly to release a bale. Thereupon the rear arms drop by gravity to their original latched position and the spring means return the upper arms to their elevated position to start rolling another bale. During discharge the drive connection to the baling chain means is disengaged.

The principle of the Avery baler is sound, and it produces a fairly tightly rolled bale; but the means for releasing a finished bale has some disadvantages.

In addition, Sherman Swan, now deceased, of Jeffersontown, Kentucky, developed a baler prior to the present invention which is illustrated and the operation of which is described in The Progressive Farmer (Kentucky and West Virginia edition) Vol. 86, No. 5 (May 1971) p. 16. The Swan apparatus makes relatively loose bales of hay, instead of tight-rolled bales. To discharge a bale the apparatus is tilted about a pivot at its forward end, using a hydraulic cylinder and piston unit, to elevate the rear of the baler. The bale discharge is simple and positive. Both the Avery device and the Swan device form the hay into manageable bales which can be handled with a fork lift.

SUMMARY OF THE INVENTION

The principal object of the present invention is to provide improved apparatus for rolling a windrow of hay into a series of separate bales in contact with the ground. As used herein, of course, the word "hay" is intended to include all fodder crops which are windrowed and are capable of being rolled into a bale. The word "windrow" includes a swath.

In accordance with the present invention, a bale is released from the baling apparatus by tilting the entire unit about a transverse pivot so as to elevate its rear end for the purpose of releasing the bale. This permits the rear lower baling chain sprockets to be mounted directly upon the frame and eliminates the latching and unlatching required in the prior art Avery apparatus. The tilting apparatus constitutes an improvement upon Swan's.

Preferably the means for tilting the baler about the transverse pivot constitutes a pair of hydraulic cylinder and piston means operated off the hydraulic system of a tractor which tows the baling apparatus along a windrow of hay.

In the present apparatus, a wheeled chassis includes side beams, and a baler frame positioned between the beams has its front end pivotally mounted on the beams. A pair of hydraulic cylinder and piston units are pivoted on the beams and on the frame behind the wheels so that when they are extended the frame is tilted upwardly about the pivots to raise its rear end for the release of a bale.

DETAILED DESCRIPTION OF THE INVENTION

Figure 1:
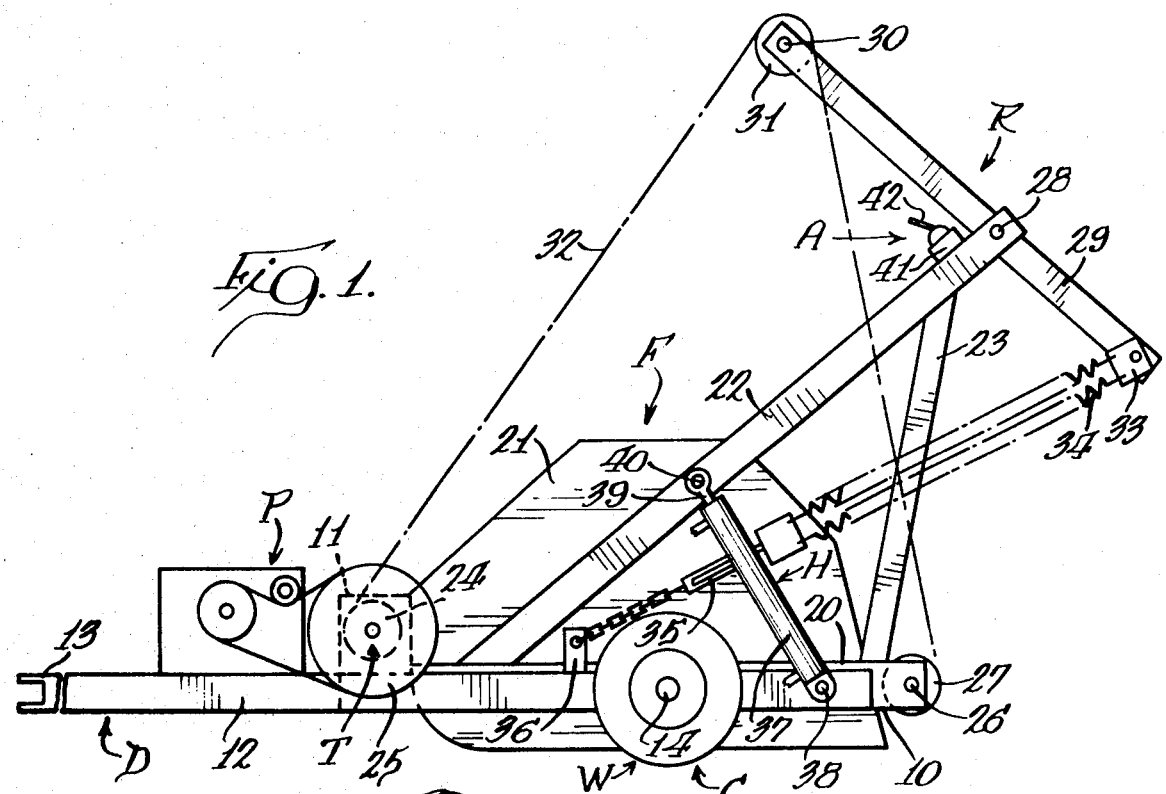
FIG. 1 is a side elevational view of the present invention with the parts in the position that they occupy during the early stages of the rolling of a bale.

Referring to the drawings, it will be understood that, except for the front end of the draft means, every element shown has a counterpart on the opposite side of the apparatus. In accordance with the present invention a chassis, indicated generally at C, has supporting wheels W, and its forward portion provides draft means D for towing the apparatus behind a tractor. A frame, indicated generally at F, on which is mounted bale rolling means, indicated generally at R, has its front end supported on transverse pivot means T about which the frame F may tilt relative to the chassis C to elevate the rear end of the frame for release of a bale. Means for tilting the frame rapidly about the pivot means T consists of a pair of hydraulic cylinder and piston units H on opposite sides of the frame F which are adapted to be connected to the tractor's hydraulic system. Actuating means A initiates operation of the tilting means H when a bale reaches a predetermined size to release the bale from the chamber.

Power drive means, indicated generally at P, is provided for driving the bale rolling means R. As is well known in the agricultural equipment art, the power drive means P may be either a hydraulic motor driven off the tractor's hydraulic system, or it may be a mechanical drive off the tractor power take-off.

Referring to the drawings in more detail, the chassis C includes a pair of parallel side beams 10 which have upwardly offset integral pivot brackets 11 at their forward ends on which the transverse pivot means T is mounted. Forward of the brackets 11 the side beams have converging portions 12 which are joined at their forward ends and equipped with a bifurcated coupler 13 so as to provide the draft means D. Stub axles 14 support the wheels W on the side beams about halfway from the pivot brackets 11 to the rear ends of the beams.

The frame F includes main side beams 20, upright side plates 21, and such cross frame members (not shown) as may be required. Inclined support arms 22 and rear braces 23 complete the frame. The frame is positioned between the side beams 10, and its front end is pivoted on the transverse pivot means T.

The bale rolling means R includes rotatable front sprocket means 24 consisting of a pair of spaced sprockets that are keyed on an input shaft which is coaxial with the transverse pivot means T and has an outboard drive sprocket 25 by means of which it is driven from the power drive means P. At the rear of the side beams 20 is a fixed cross shaft 26 on which rear sprocket means 27 is journalled consisting of a pair of sprockets which are longitudinally aligned with the front sprockets 24. As seen in FIG. 1, the rear sprockets 27 are somewhat lower than the front sprockets 24.

Aligned pivots 28 near the outer end of the inclined support arms 22 pivotally support a pair of upper sprocket mounting arms 29 the upper ends of which support a cross shaft 30 on which upper sprockets 31 are journalled in longitudinal alignment with the sprockets 24 and 27, and hay rolling chain means, indicated generally at 32, is trained around the front sprocket means 24, the upper sprocket means 31, and the rear sprocket means 27. The structure of the chain means 32 is substantially like that disclosed in Avery U.S. Pat. No. 3,110,145, so is not described in detail.

At the lower ends of the pivoted mounting arms 29 are spring brackets 33 on which are anchored the upper ends of tension spring means 34 which are connected through turnbuckle adjustments 35 with spring brackets 36 on the side beams 10. Thus, the pivoted arms 29 provide means mounting the upper sprocket means for bodily movement between a starting position which is generally as illustrated in FIG. 1 and a terminal position; and the spring means 39 provides resilient means urging the upper sprocket means 31 to said starting position. Toward the end of a bale rolling operation the arms 29 are much lower at the front than they are in the drawings.

The hydraulic cylinder and piston units H include cylinders 37 which are pivotally connected at 38 adjacent the rear of the side beams 10 of the chassis, and the pistons have piston rods 39 which are pivotally connected at 40 to the inclined support arms 22 of the frame F. The hydraulic cylinder and piston units H provide linearally extensible and retractable tilting units between the chassis and the sides of the frame behind the wheels.

No description of the operation of the baling means is provided, because except for the bale release means the operation is substantially identical with that of Avery U.S. Pat. No. 3,110,145. The actuating means A for bale release includes a hydraulic valve 41 which is adjustably mounted on one of the inclined support arms 22 of the frame and which has an actuating lever 42 in a position to be contacted by the adjacent upper sprocket mounting arm 29 when that arm has swung a sufficient distance downwardly about the pivots 28 in the course of a bale rolling operation.

Instead of the automatic actuating means illustrated in the drawings, the actuating means A may have its valve 41 mounted at the front of the frame F or on the draft means D, and its lever 42 may have a cord extending forwardly to a position where it is readily accessible to an operator on the tractor.

Figure 2:
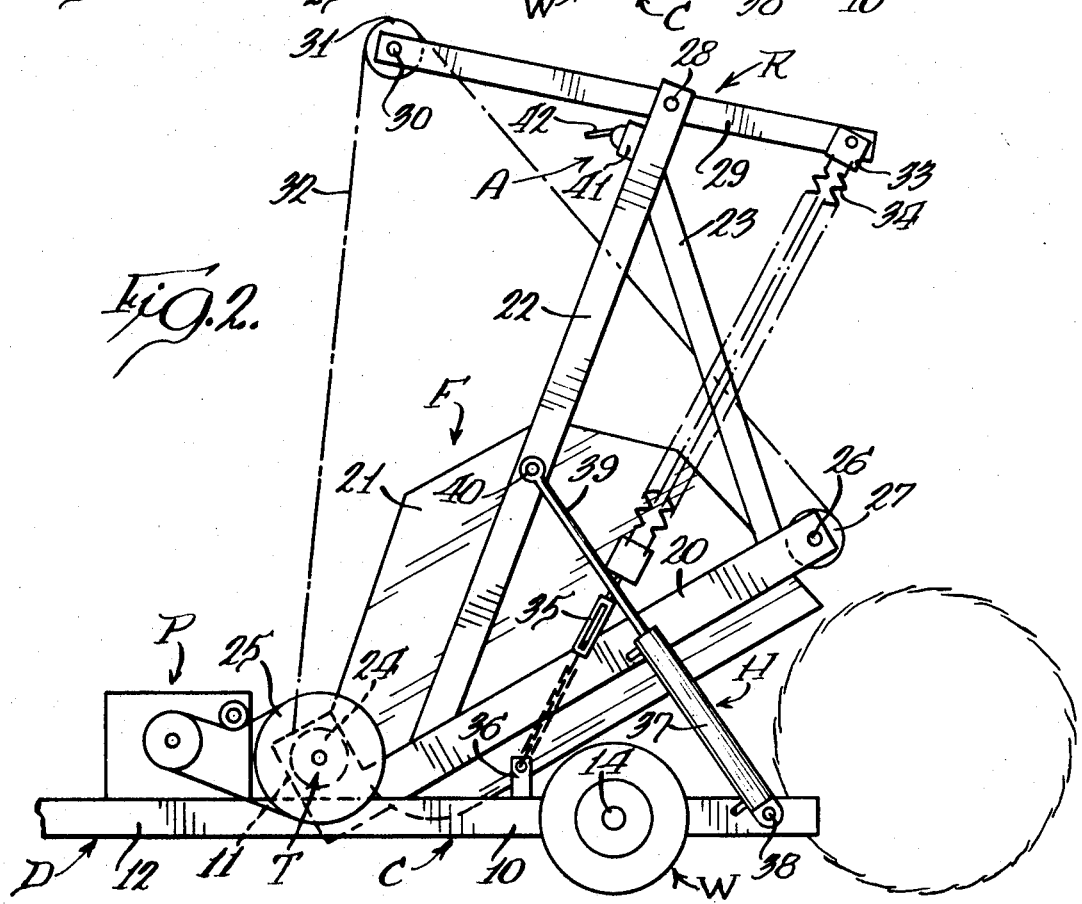
FIG. 2 is a side elevational view of the apparatus of FIG. 1 with the parts in the position that they occupy during release of the bale.

When a bale has reached a desired size, the operating lever 42 of the valve 41 is moved to admit hydraulic fluid to the rear of the cylinders 37 and thus extend the piston robs 39. This tilts the frame F about the pivot means T, raising its rear end to a position above the top of a finished bale. After the apparatus has moved forwardly a sufficient distance to clear the finished bale as seen in FIG. 2, the valve actuating lever 42 is released and the hydraulic cylinder and piston units H are returned to their retracted, running positions.

The foregoing detailed description is given for clearness of understanding only and no unnecessary limitations should be understood therefrom, as modifications will be obvious to those skilled in the art.

I claim:

1. Hay bale rolling apparatus comprising, in combination:
   a chassis including a pair of parallel side beams provided with supporting wheels which are adapted to span a windrow of hay;
   a frame between the side beams, said frame defining a baling chamber which is open at the bottom;
   means in the frame for rolling hay in a windrow into a manageable bale as the apparatus is moved forwardly along the windrow;
   transverse pivot means at the front of the frame which mounts the frame on the chassis for upward tilting movement about said pivot means;
   a pair of extensible and retractable units to the rear of the pivot means, said extensible and retractable units being pivotally connected at one end to the chassis and at the other end to the frame, and said units having a retracted running position in which the open bottom of the frame is near the ground and an extended bale releasing position in which the frame is tilted upwardly about the pivot means;
   means for actuating said units when a bale reaches a desired size to extend the units;
   and means for returning the units to running position.

2. The apparatus of claim 1 in which the side beams converge forwardly of the frame to provide draft means which is adapted to be coupled to a tractor draw bar.

3. The apparatus of claim 1 in which the wheels are generally midway between the pivot means and the rear of the frame.

4. The apparatus of claim 3 in which the extensible and retractable units are behind the wheels.

5. The apparatus of claim 1 in which the extensible and retractable units are near the rear of the apparatus.

6. The apparatus of claim 1 in which the pair of extensible and retractable units is mounted to the rear of the pivot means, said units having a retracting running position and an extended bale releasing position, and the means for actuating the units extends them when a bale reaches a desired size.

* * * * *